United States Patent
Shimizu et al.

(10) Patent No.: US 8,370,049 B1
(45) Date of Patent: Feb. 5, 2013

(54) CONTROL SYSTEM OF INTERNAL COMBUSTION ENGINE

(75) Inventors: Rio Shimizu, Mishima (JP); Yasuyuki Irisawa, Susono (JP); Koji Aso, Susono (JP); Tomojiro Sugimoto, Susono (JP); Hiroshi Tanaka, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 452 days.

(21) Appl. No.: 12/785,056

(22) Filed: May 21, 2010

(51) Int. Cl.
G06F 19/00 (2011.01)
F02D 41/04 (2006.01)
F02D 41/14 (2006.01)
F02M 43/00 (2006.01)
F01N 3/18 (2006.01)
F01N 3/36 (2006.01)

(52) U.S. Cl. ......... 701/104; 123/1 A; 123/304; 123/435; 123/575; 123/676; 701/110; 701/111; 60/285; 60/286

(58) Field of Classification Search .......... 123/1 A, 123/3, 27 GE, 299, 300, 304, 305, 435, 436, 123/478, 480, 486, 526, 527, 575; 701/102–105, 701/109–111; 60/274, 276, 277, 284–286, 60/299, 303
See application file for complete search history.

(56) References Cited

U.S. PATENT DOCUMENTS

| | | | |
|---|---|---|---|
| 2009/0107121 A1* | 4/2009 | Yoshida et al. | 60/286 |
| 2010/0288211 A1* | 11/2010 | Agosta | 123/3 |
| 2011/0023855 A1* | 2/2011 | Van Nieuwstadt et al. | 60/276 |
| 2011/0259290 A1* | 10/2011 | Michikawauchi et al. | 123/1 A |
| 2011/0264355 A1* | 10/2011 | Iwatani et al. | 701/103 |
| 2011/0265455 A1* | 11/2011 | Hirota et al. | 60/285 |
| 2011/0283684 A1* | 11/2011 | Aso et al. | 60/285 |
| 2011/0283959 A1* | 11/2011 | Aso et al. | 60/286 |

FOREIGN PATENT DOCUMENTS

JP A-05-332152 12/1993

* cited by examiner

Primary Examiner — Willis R Wolfe, Jr.
(74) Attorney, Agent, or Firm — Oliff & Berridge, PLC

(57) ABSTRACT

A control system of an internal combustion engine in which as fuel, a first fuel of ammonia and a second fuel easier to burn than ammonia are used. These two types of fuel are burned in the combustion chamber. A basic ammonia ratio is set in accordance with an engine load and engine speed. The set basic ammonia ratio is corrected based on at least one of a combustion state, knocking strength, temperature of an exhaust gas or temperature of a catalyst arranged in an engine exhaust passage, $NO_x$ concentration in the exhaust gas, actual compression ratio, air-fuel ratio, and fuel properties.

15 Claims, 19 Drawing Sheets

CONTROL SYSTEM OF INTERNAL COMBUSTION ENGINE

BACKGROUND OF THE INVENTION

1. Field of the Invention

The present invention relates to a control system of an internal combustion engine.

2. Description of the Related Art

In an internal combustion engine, in the past, the fuel used has mainly been fossil fuels. However, in this case, burning such fuels produces $CO_2$, which causes global warming. On the other hand, burning ammonia does not produce $CO_2$ at all. Thus, there is known an internal combustion engine made so as to use ammonia as fuel and not produce $CO_2$ (for example, see Japanese Patent Publication (A) No. 5-332152).

However, ammonia is harder to burn compared with fossil fuels. Therefore, when using ammonia as fuel, some sort of measure is required for making the ammonia easier to burn. Thus, in the above-mentioned internal combustion engine, exhaust heat is utilized to reform the ammonia so as to produce reformed gas comprised of hydrogen and nitrogen, the hydrogen in the produced reformed gas is stored in a hydrogen storing alloy, and the hydrogen stored in the hydrogen storing alloy is fed together with the ammonia in a combustion chamber so as to enable easier combustion even when using ammonia as fuel.

SUMMARY OF THE INVENTION

In this regard, in order to secure stable combustion in such an internal combustion engine, it is necessary to set a ratio of ammonia and hydrogen fed into a combustion chamber to an optimal ratio in accordance with an engine load and an engine speed. However, other than the engine load and engine speed, the external environment and other various factors exert an influence in the combustion. Therefore, in order to secure stable combustion, the ratio of ammonia and hydrogen must be set considering these factors. Sometimes the ratio of ammonia and hydrogen must be set from a request separate from securing stable combustion. However, Japanese Patent Publication (A) No. 5-332152 suggests nothing regarding this.

Therefore, in the present invention, there is provided a control system of an internal combustion engine using a first fuel of ammonia and a second fuel which is easier to burn than ammonia as fuel and feeding these two types of fuel into a combustion chamber to burn the fuel in the combustion chamber, wherein a basic ammonia ratio indicating a ratio of an amount of ammonia fed with respect to a total amount of fuel fed in accordance with an engine load and an engine speed is set, and the set basic ammonia ratio is corrected based on at least one among a combustion state, knocking strength, temperature of an exhaust gas or temperature of a catalyst arranged in an engine exhaust passage, $NO_x$ concentration in the exhaust gas, actual compression ratio, air-fuel ratio, and fuel properties.

In the present invention, stable combustion and a combustion state in accordance with a request can be obtained.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Figure 1:
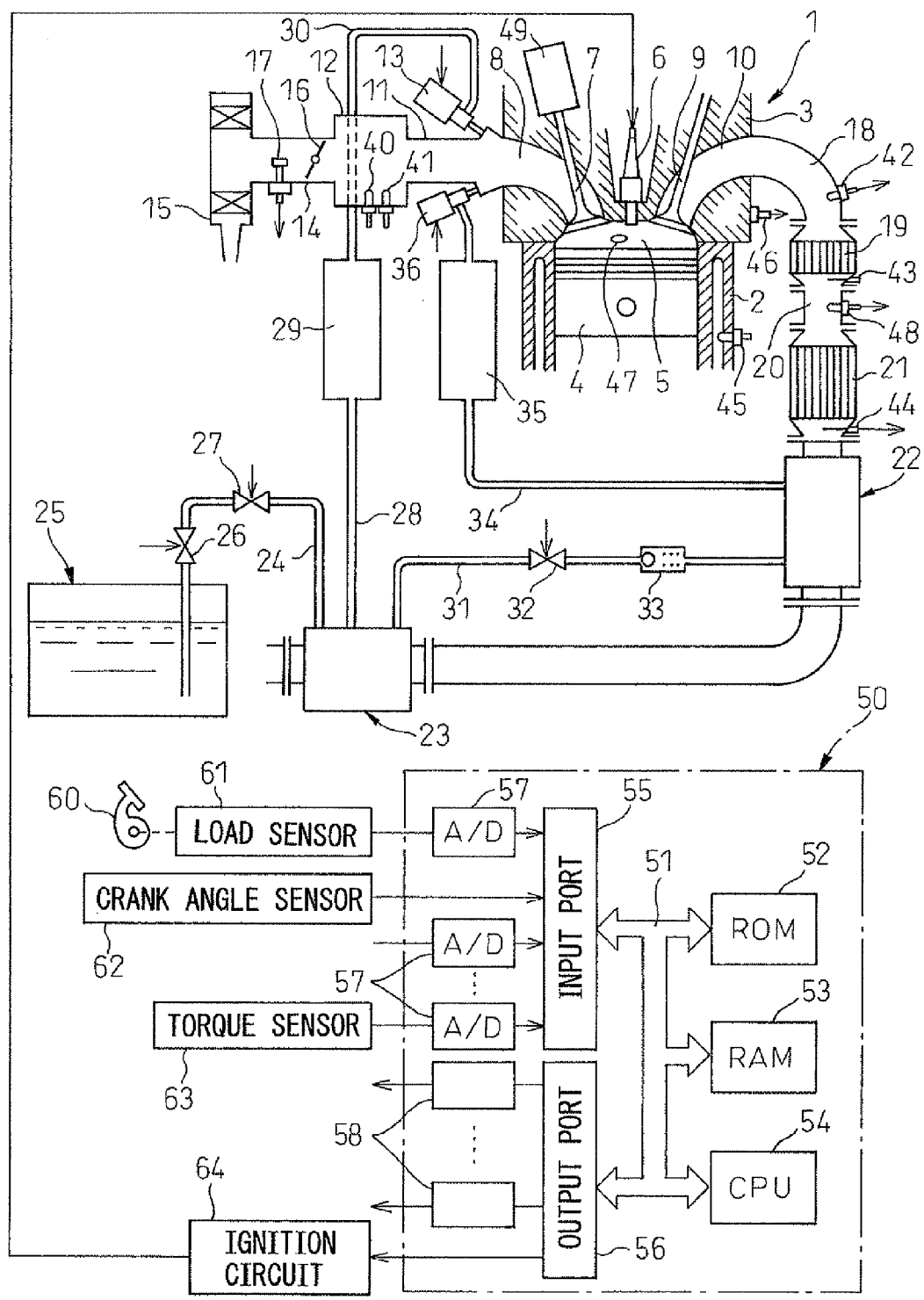
FIG. 1 is an overall view of an internal combustion engine.

Referring to FIG. 1, 1 indicates an internal combustion engine body, 2 a cylinder block, 3 a cylinder head, 4 a piston, 5 a combustion chamber, 6 a plasma jet spark plug emitting a plasma jet, 7 an intake valve, 8 an intake port, 9 an exhaust valve, and 10 an exhaust port. Further, in the internal combustion engine shown in FIG. 1, as the fuel, a first fuel of ammonia and a second fuel which is easier to burn than ammonia are used. These two types of fuel are fed into the combustion chamber 5 and ignited by the plasma jet spark plug 6 to burn.

As this second fuel, use can be made of gasoline, liquefied natural gas, or hydrogen obtained by reforming ammonia. FIG. 1 shows a case where use is made of hydrogen obtained by reforming ammonia among these second fuels.

Referring to FIG. 1, the intake port 8 is connected to a surge tank 12 through an intake branch pipe 11. In each intake branch pipe 11, an ammonia injector 13 for injecting gaseous ammonia toward the interior of each corresponding intake port 8 is arranged. The surge tank 12 is connected to an air cleaner 15 through an intake duct 14. In the intake duct 14, a throttle valve 16 driven by an actuator and an intake air amount detector 17 using for example a hot wire are arranged.

On the other hand, the exhaust port 10 is connected through an exhaust manifold 18 to a three-way catalyst or oxidation catalyst 19. When the three-way catalyst or oxidation catalyst 19 is activated, the unburned ammonia contained in the exhaust gas is oxidized in the three-way catalyst or oxidation catalyst 19. On the other hand, the three-way catalyst or oxidation catalyst 19 is connected through an exhaust pipe 20 to an exhaust purification catalyst 21. In the embodiment shown in FIG. 1, this exhaust purification catalyst 21 is comprised of an $NO_x$ storage catalyst which stores $NO_x$ contained in the exhaust gas when the air-fuel ratio of the inflow exhaust gas is lean and releases the stored $NO_x$ when the air-fuel ratio of the inflowing exhaust gas becomes the stoichiometric air-fuel ratio or rich. In the exhaust passage downstream of this $NO_x$ storage catalyst 21, a reformer 22 and a vaporizer 23 are arranged.

The vaporizer 23 is connected through an ammonia inflow pipe 24 to a fuel tank 25. In this ammonia inflow pipe 24, a shut-off valve 26 which is open at the time of engine operation and is closed when the engine stops and a pressure regulator 27 are arranged. The interior of the fuel tank 25 is filled with 0.8 MPa to 1.0 MPa or high pressure liquid ammonia. The liquid ammonia in the fuel tank 25 is fed into the vaporizer 23 through the ammonia inflow pipe 24. In the embodiment shown in FIG. 1, the vaporizer 23 is formed so as to be heated by the exhaust gas. Accordingly, the liquid ammonia fed into the vaporizer 23 is vaporized in the vaporizer 23.

The gaseous ammonia vaporized in the vaporizer 23 is fed through an ammonia outflow pipe 28 into an ammonia gas tank 29. The gaseous ammonia in the ammonia gas tank 29 is fed through a gaseous ammonia feed pipe 30 to the ammonia injector 13. The gaseous ammonia is injected from the ammonia injector 13 toward the interior of the corresponding intake port 8.

On the other hand, the vaporizer 23 is connected through an ammonia outflow pipe 31 to the reformer 22. In this ammonia outflow pipe 31, a reformer control valve 32 which is open when the reformer 22 is performing a reform action and a check valve 33 enabling only flow from the vaporizer 23 toward the reformer 22 are arranged in series. When the reformer control valve 32 is open and the pressure in the reformer 22 becomes lower than the pressure in the vaporizer 23, the gaseous ammonia in the vaporizer 23 is fed through the ammonia outflow pipe 31 into the reformer 22.

In the embodiment shown in FIG. 1, the reformer 22 is formed so as to be heated by the exhaust gas. Further, in this reformer 22, a catalyst for promoting the reform action of ammonia is arranged. When the temperature in the reformer 22 becomes the temperature at which the reform action of ammonia is carried out or more, for example, several hundreds of degrees, the ammonia fed into the reformer 22 from the vaporizer 23 is broken down to hydrogen and nitrogen ($2NH_3 \rightarrow N_2+3H_2$), that is, reformed. As a result, reformed gas containing hydrogen is produced in the reformer 22. When ammonia is broken down into hydrogen and nitrogen, the number of moles becomes double. With the addition of the thermal expansion of the reformed gas by heating action as well, the pressure in the reformer 22 rises. This raised pressure reformed gas is fed through a reformed gas feeding pipe 34 into a reformed gas storage tank 35.

As shown in FIG. 1, a second fuel use fuel injector 36 for injecting the reformed gas toward the interior of a corresponding intake port 8 is arranged in each intake branch pipe 11. The reformed gas stored in the reformed gas storage tank 35 is fed to the fuel injector 36. From each fuel injector 36, the reformed gas is injected toward the interior of each corresponding intake port 8.

When gasoline is used as the second fuel, it is not necessary to provide a reformer 22. In this case, the gasoline stored in the gasoline tank is injected from the fuel injector 36. On the other hand, when liquefied natural gas is used as the second fuel as well, it is not necessary to provide the reformer 22. In this case, the liquefied natural gas stored in the liquefied natural gas tank is injected from the fuel injector 36.

As shown in FIG. 1, an electronic control unit 50 is comprised of a digital computer provided with a ROM (read only memory) 52, RAM (random access memory) 53, CPU (microprocessor) 54, input port 55, and output port 56 all connected to each other through a bidirectional bus 51. In the surge tank 21, an intake air temperature sensor 40 for detecting the temperature of the intake air and a humidity detection sensor 41 for detecting the humidity in the intake air are arranged. In the exhaust manifold 18, an air-fuel ratio sensor 42 for detecting the air-fuel ratio is arranged.

On the other hand, downstream of the three-way catalyst or oxidation catalyst 19, a temperature sensor 43 for detecting the exhaust gas temperature is arranged. Downstream of the $NO_x$ storage catalyst 21 as well, a temperature sensor 44 for detecting the exhaust gas temperature is arranged. Further, in the engine body 1, a water temperature sensor 45 for detecting an engine cooling water temperature and a knocking sensor 46 generating an output voltage proportional to the knocking strength are arranged. Further, in the combustion chamber 5, a combustion pressure sensor 47 is arranged. Output signals of the intake air amount detector 17 and sensors 40, 41, 42, 43, 44, 45, 46, and 47 are input to the input port 55 through corresponding AD converters 57.

An accelerator pedal 60 is connected to a load sensor 61 generating an output voltage proportional to the amount of depression of the accelerator pedal 60. The output voltage of the load sensor 61 is input through a corresponding AD converter 57 to the input port 55. Further, a crank angle sensor 62 generating an output pulse each time the crankshaft rotates by for example 30° is connected to the input port 55. Further, the input port 55 receives as input an output signal of a torque sensor 63 expressing an output torque of the engine through a corresponding AD converter 57. On the other hand, the output port 56 is connected to an ignition circuit 64 of the plasma jet spark plug 6. Further, the output port 56 is connected through corresponding drive circuits 58 to each ammonia injector 13, a driving actuator of the throttle valve 16, shut-off valve 26, pressure regulator 27, reformer control valve 32, and each fuel injector 36.

Figure 2:
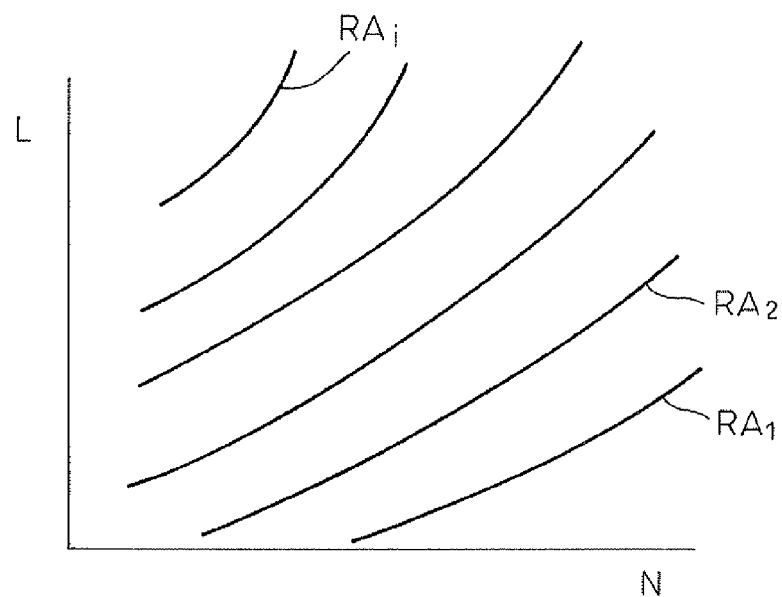
FIG. 2 is a view showing a basic ammonia ratio RA.

FIG. 2 shows a basic ammonia ratio RA (%) showing the ratio of the amount of ammonia fed to the total amount of fuel fed. The solid lines $RA_1$, $RA_2$, ..., $RA_i$ in FIG. 2 show the equivalent ammonia ratio lines. From $RA_1$ to $RA_i$, the ammonia ratio is gradually increased. Note that, in FIG. 2, the ordinate L indicates the engine load, while the abscissa N indicates the engine speed.

Ammonia is harder to burn compared with the second fuel. Therefore, to make the mixed gas of ammonia and the second fuel ignite and burn well in the combustion chamber 5, it is necessary to make the ammonia ratio smaller the lower the temperature of the mixed gas at the time of ignition. Therefore in this embodiment according to the present invention, as shown in FIG. 2, the more the engine load L falls, the more the basic ammonia ratio RA is made to fall, and the higher the engine speed N, the lower the basic ammonia ratio RA.

That is, the lower the engine load L, the smaller the opening degree of the throttle valve 16 is made, so the compression end pressure in the combustion chamber 5 becomes lower the lower the engine load L. Therefore, the temperature of the mixed gas in the combustion chamber 5 at the end of the compression stroke in which ignition is performed becomes lower the lower the engine load L and therefore, as shown in FIG. 2, the basic ammonia ratio RA is made lower when the engine load L falls.

On the other hand, the ignition timing is made earlier the higher the engine speed N and therefore the pressure inside the combustion chamber 5 when the fuel is ignited becomes lower the higher the engine speed N. Therefore, the temperature of the mixed gas in the combustion chamber 5 when the fuel is ignited becomes lower the higher the engine speed N and therefore, as shown in FIG. 2, the basic ammonia ratio RA is made to fall if the engine speed N becomes higher.

The basic ammonia ratio RA shown in FIG. 2 shows the ammonia ratio giving the best combustion as found by experiments. In this embodiment according to the present invention, the basic ammonia ratio RA shown in FIG. 2 is stored in advance in the ROM 52, and this stored basic ammonia ratio RA is used as the ammonia ratio. Accordingly, in the embodiment according to the present invention, the basic ammonia ratio RA is set in advance in accordance with the engine load and engine speed. Below, values of various parameters in the representative operating state when this basic ammonia ratio RA is set will be referred to as the "reference values".

When the operating state is the above representative operating state, if making the ammonia ratio the predetermined basic ammonia ratio RA, that is, the reference value, the most stable combustion is obtained. However, if the operating state changes from the representative operating state explained above, the ammonia ratio with which the most stable combustion is obtained will change as well. Further, the ammonia ratio must be set from a request different from such securing of stable combustion in certain cases.

Therefore, in the present invention, the set basic ammonia ratio RA is corrected based on at least one among a combustion state, knocking strength, temperature of the exhaust gas or temperature of the catalyst arranged in the engine exhaust passage, $NO_x$ concentration in the exhaust gas, actual compression ratio, air-fuel ratio, and fuel properties. Below, the correction of the basic ammonia ratio RA based on the combustion state and knocking strength etc. will be sequentially explained.

Figure 3:
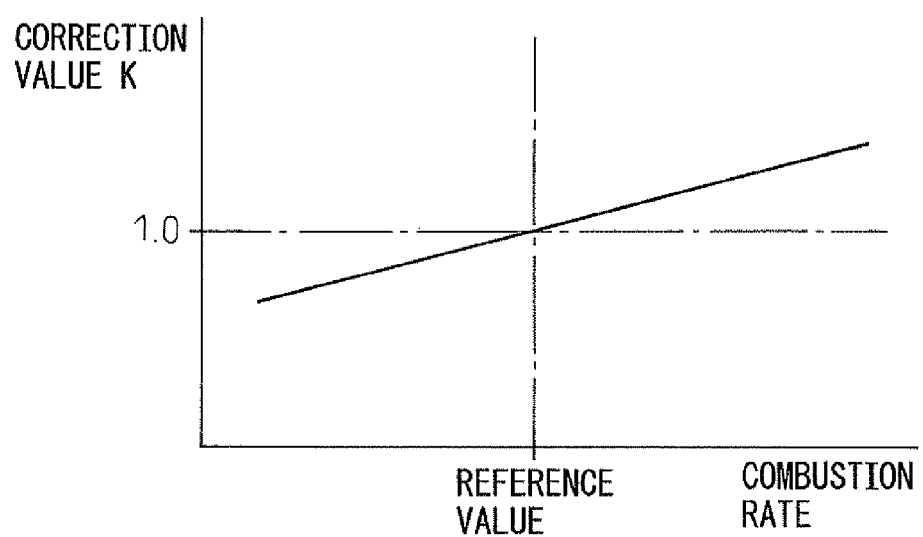
FIG. 3 is a view showing a correction value K.

As the combustion state affecting the ammonia ratio by which stable combustion is obtained, there are the combustion rate and combustion fluctuations. FIG. 3 shows the relationship between the combustion rate and the correction value K. The target ammonia ratio is obtained by multiplying the basic ammonia ratio RA by this correction value K. Accordingly, if the combustion rate is the reference value, K becomes equal to 1.0. On the other hand, when K becomes larger than 1.0, the target ammonia ratio becomes larger than the basic ammonia ratio RA, while if K is smaller than 1.0, the target ammonia ratio becomes smaller than the basic ammonia ratio RA.

Figure 4A:
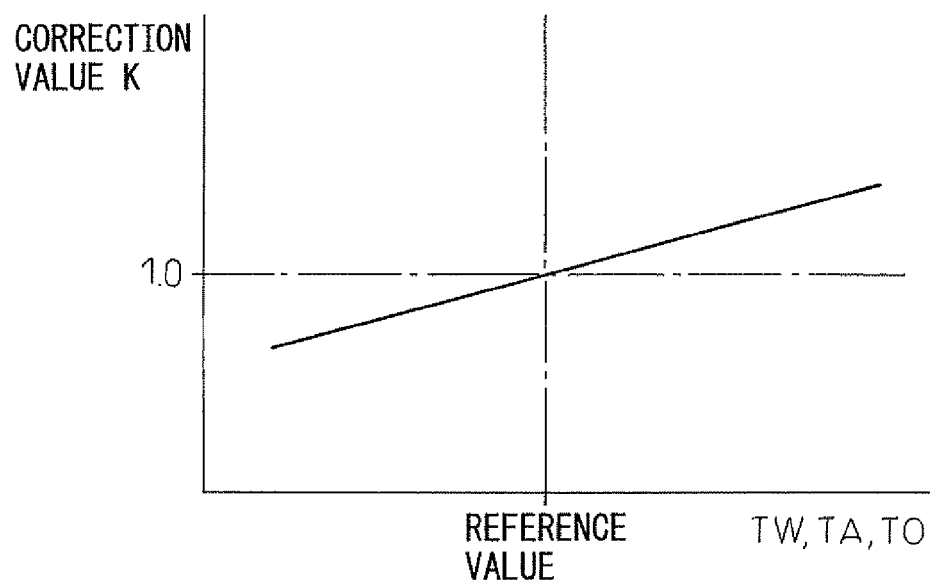
FIGS. 4A and 4B are views showing the correction value K.
Figure 4B:
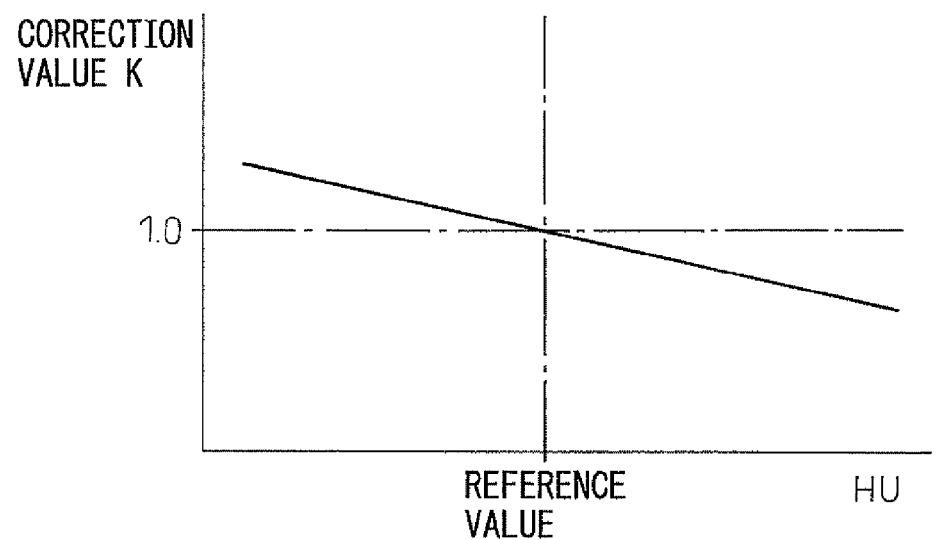

When the combustion rate of the air-fuel mixture containing the ammonia becomes high, even when the ammonia ratio is increased, stable combustion can be secured. Accordingly, as shown in FIG. 3, the faster the combustion speed, the larger the correction value K. Namely, the ammonia ratio is increased. Specifically speaking, the higher the water temperature and intake air temperature or oil temperature, the faster the combustion speed. The lower the humidity of the intake air, the faster the combustion speed. Accordingly, in the embodiment according to the present invention, as seen from FIGS. 4A and 4B, the ammonia ratio is increased as the water temperature TW, intake air temperature TA, or oil temperature TO become higher or as the humidity HU of the intake air becomes lower.

Figure 5:
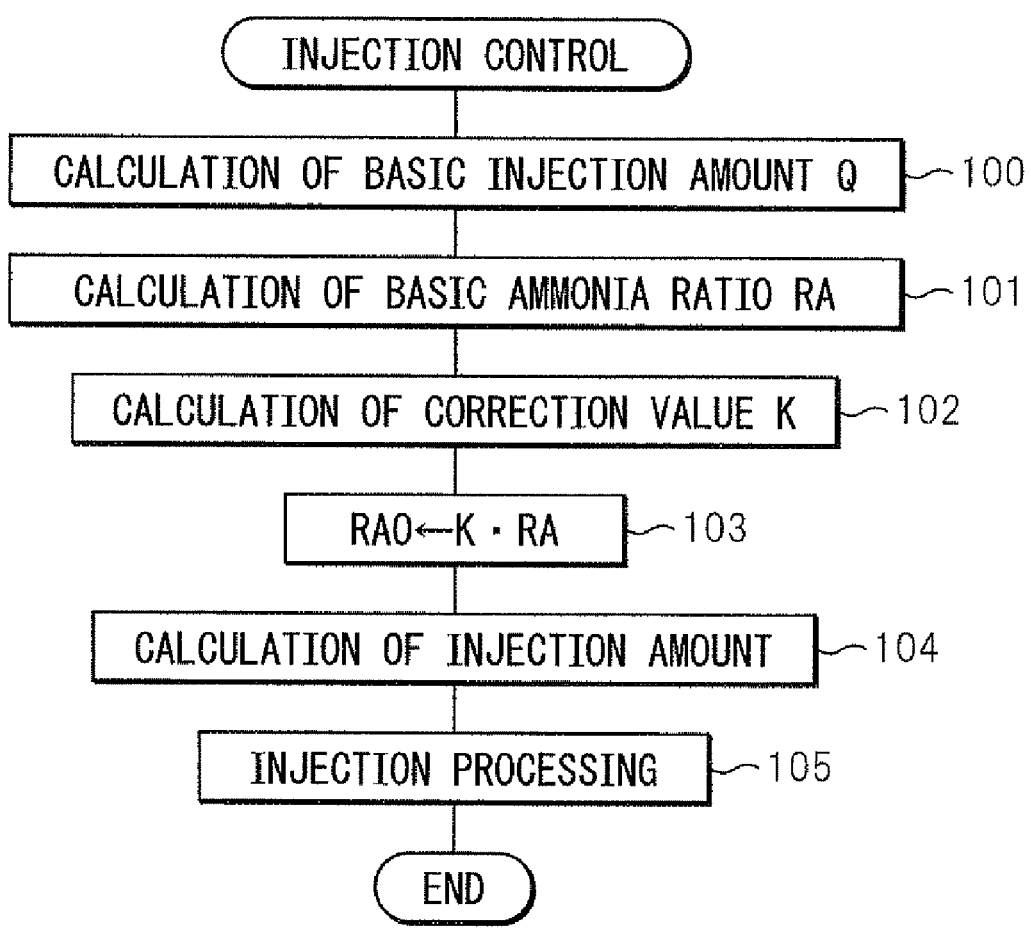
FIG. 5 is a flow chart for injection control.
Figure 6A:
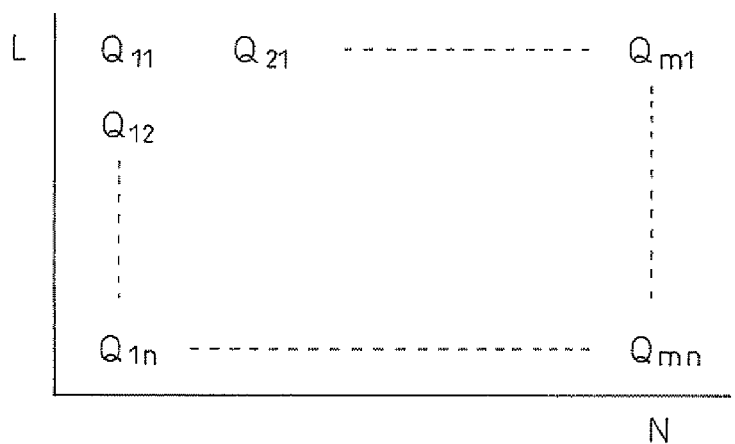
FIGS. 6A and 6B are views showing a basic injection amount Q etc.
Figure 6B:
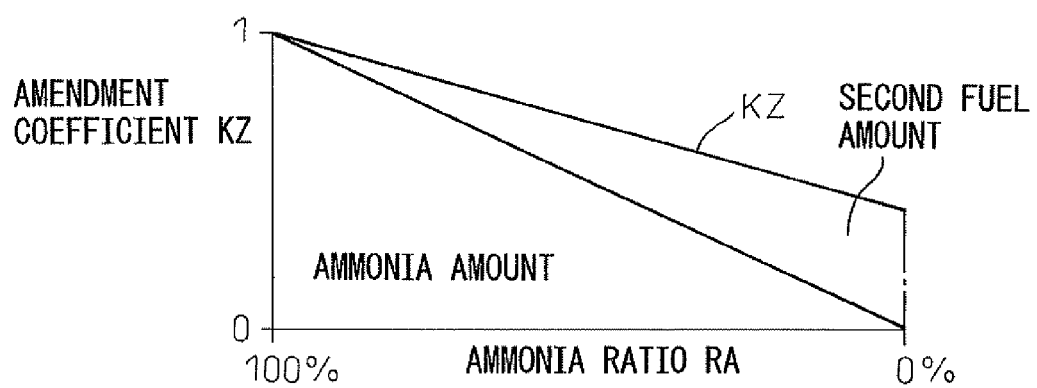

FIG. 5 shows an injection control routine. Referring to FIG. 5, first of all, at step 100, a basic injection amount Q required for making the air-fuel ratio the stoichiometric air-fuel ratio when the entire fuel is comprised of ammonia is calculated. This basic injection amount Q is stored as function of an intake air amount L per engine speed and the engine speed N as shown in FIG. 6A in the ROM 52. On the other hand, FIG. 6B shows the change of the ammonia amount and second fuel amount when the air-fuel ratio becomes the stoichiometric air-fuel ratio under the same air amount when the ammonia ratio RA changes. It is seen from FIG. 6B that the total amount of fuel decreases as the ammonia ratio RA becomes lower. Accordingly, the amount of actually injected fuel is obtained by multiplying the basic injection amount Q shown in FIG. 6A by a revision coefficient KZ shown in FIG. 6B in accordance with the ammonia ratio RA.

Next, at step 101, the basic ammonia ratio RA is calculated from the relationship shown in FIG. 2. Next, at step 102, the correction value K is calculated from FIG. 4A or 4B. Next, at step 103, by multiplying the basic ammonia ratio RA with the correction value K, the target ammonia ratio RAO (=K·RA) is calculated.

Next, at step 104, the amount of ammonia to be injected from the ammonia injector 13 and the amount of the second fuel to be injected from the fuel injector 36 are calculated based on the actual injection amount KZ·Q obtained by multiplying the basic injection amount Q by the revision coefficient KZ and the target ammonia ratio RAO calculated at step 103. Next, at step 105, the ammonia is injected from the ammonia injector 13, and the second fuel is injected from the fuel injector 36 based on the calculated amounts.

Figure 7A:
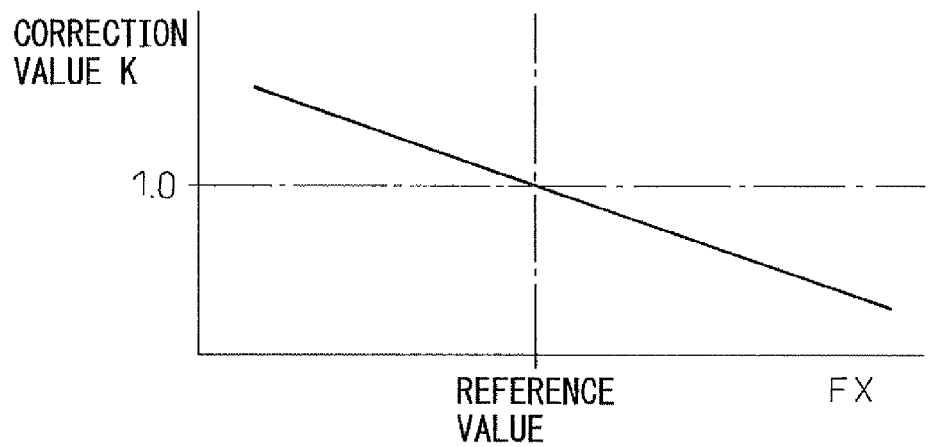
FIGS. 7A to 7C are views showing the correction value K.
Figure 7B:
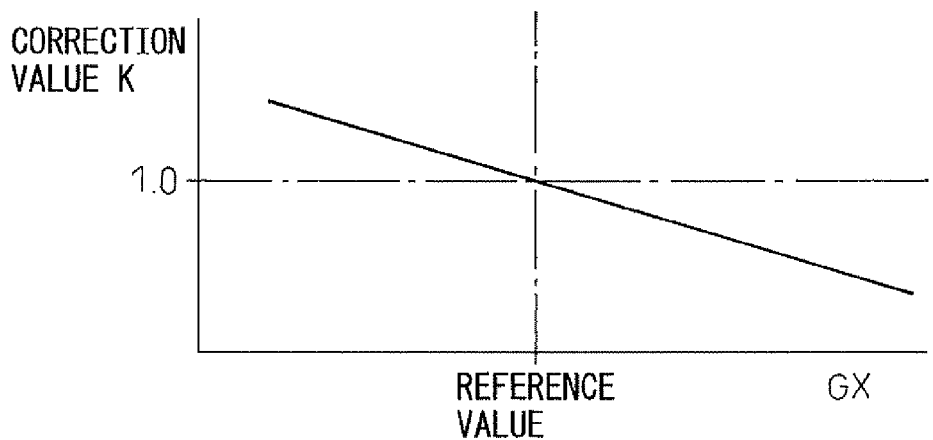

FIGS. 7A and 7B show a case where the ammonia ratio is changed in accordance with combustion fluctuation. Combustion fluctuation occurs when the air-fuel mixture containing ammonia becomes hard to burn. At this time, if the ammonia ratio is lowered to make the combustion of the air-fuel mixture easier, the combustion fluctuation becomes smaller. Accordingly, in the embodiment according to the present invention, when the combustion fluctuation becomes large, the ammonia ratio is lowered.

Namely, FIG. 7A shows the relationship between an average value FX of an amount of fluctuation of the combustion pressure and the correction value K. When the average value FX of the amount of fluctuation of the combustion pressure increases, that is, when the amount of fluctuation of the combustion pressure becomes large, the correction value K is made small and the ammonia ratio is lowered. On the other hand, FIG. 7B shows the relationship between an average value GX of the amount of fluctuation of the engine output torque and the correction value K. When an average value GX of the amount of torque fluctuation increases, that is, when the amount of torque fluctuation becomes large, the correction value K is made smaller and the ammonia ratio is lowered.

Figure 7C:
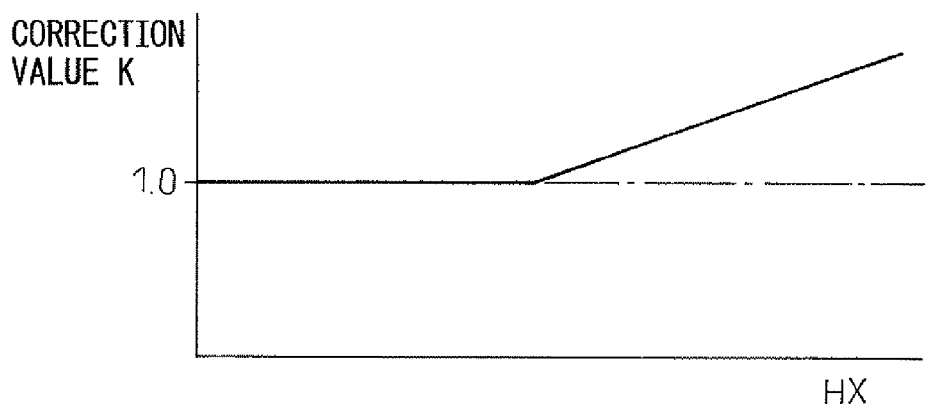

FIG. 7C shows the relationship between the knocking strength HX and the correction value K. Ammonia is higher in anti-knock property in comparison with the second fuel. Accordingly, when ammonia is used, knocking becomes harder to occur in comparison with the case where the second fuel is used. Accordingly, as shown in FIG. 7C, when the knocking strength HX increases, the correction value K is increased, and the ammonia ratio is increased.

Figure 8:
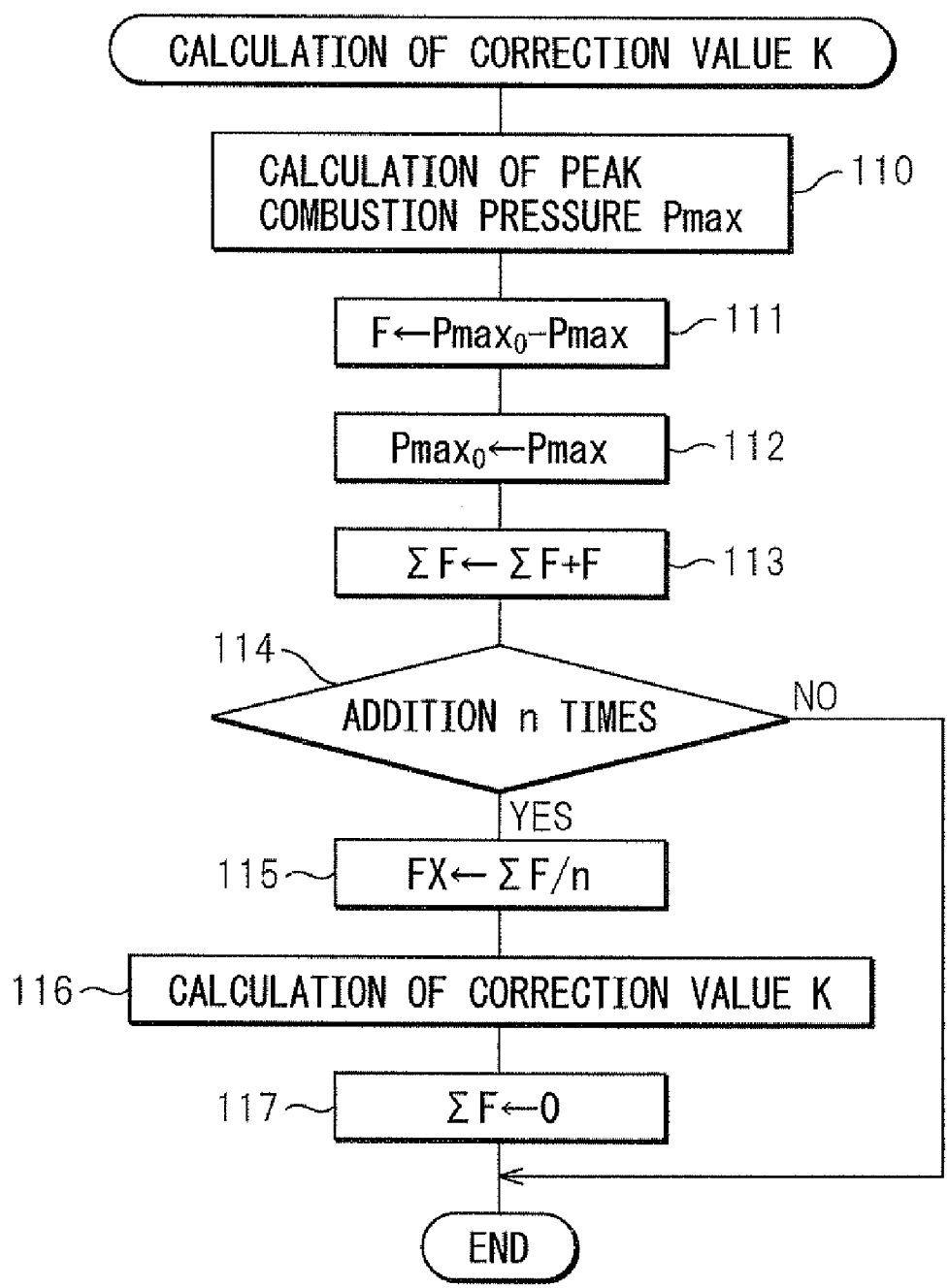
FIG. 8 is a flow chart for calculating the correction value K.

FIG. 8 shows the routine for calculating the correction value K shown in FIG. 7A. Note that, when the correction value K is calculated in this routine, the injection control is carried out by the routine shown in FIG. 5. Referring to FIG. 8, first of all, at step 110, a peak combustion pressure Pmax in the combustion chamber 5 is calculated from the output signal of the combustion pressure sensor 47. Next, at step 111, a difference F (=Pmaxo−Pmax) between a peak combustion pressure Pmaxo before the present cycle by 1 cycle and Pmax is calculated. Next, at step 112, Pmax is made Pmaxo. Next, at step 113, the difference F is added to an sum value ΣF.

Next, at step 114, it is determined whether the difference F is added n times. When the difference F is added n times, the routine proceeds to step 115 where the sum value ΣF is divided by n, whereby an average value FX of the difference F is calculated. Next, at step 116, based on this average value FX, the correction value K is calculated from FIG. 7A. Next, ΣF is cleared at step 117.

Figure 9:
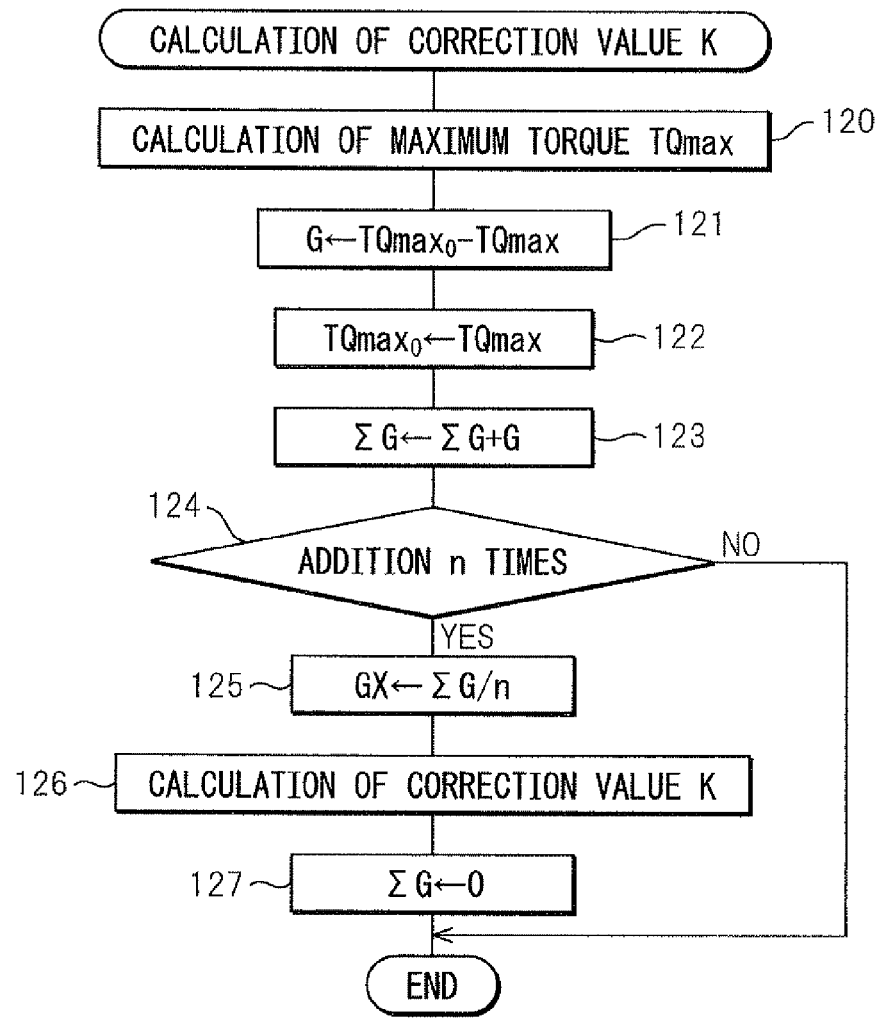
FIG. 9 is a flow chart for calculating the correction value K.

FIG. 9 shows a routine for calculating the correction value K shown in FIG. 7B. Note that, when the correction value K is calculated in this routine, the injection control is carried out according to the routine shown in FIG. 5. Referring to FIG. 9, first of all, at step 120, the maximum torque TQmax is calculated from the output signal of the torque sensor 63. Next, at step 121, a difference G (=TQmaxo−Tqmax) between the maximum torque TQmaxo before the present torque by 1 cycle and TQmax is calculated. Next, at step 122, TQmax is made TQmaxo. Next, at step 123, the difference G is added to the sum value ΣG.

Next, at step 124, it is determined whether the difference G is added n times. When the difference G is added n times, the routine proceeds to step 125 where the sum value ΣG is divided by n, whereby the average value GX of the difference G is calculated. Next, at step 126, the correction value K is calculated from FIG. 7B based on this average value GX. Next, the EG is cleared at step 127.

Figure 10:
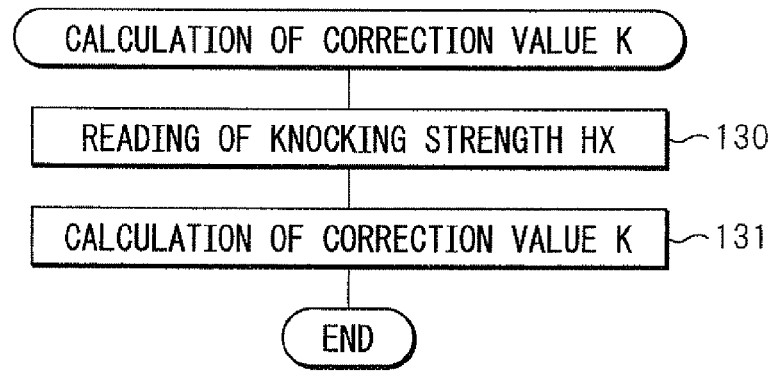
FIG. 10 is a flow chart for calculating the correction value K.

FIG. 10 shows a routine for calculating the correction value K shown in FIG. 7C. Note that, when the correction value K is calculated in this routine, the injection control is carried out according to the routine shown in FIG. 5. Referring to FIG. 10, first of all, at step 130, a knocking strength HX detected by the knocking sensor 46 is read. Next, at step 131, the correction value K is calculated from FIG. 7C based on this knocking strength HX.

Figure 11:
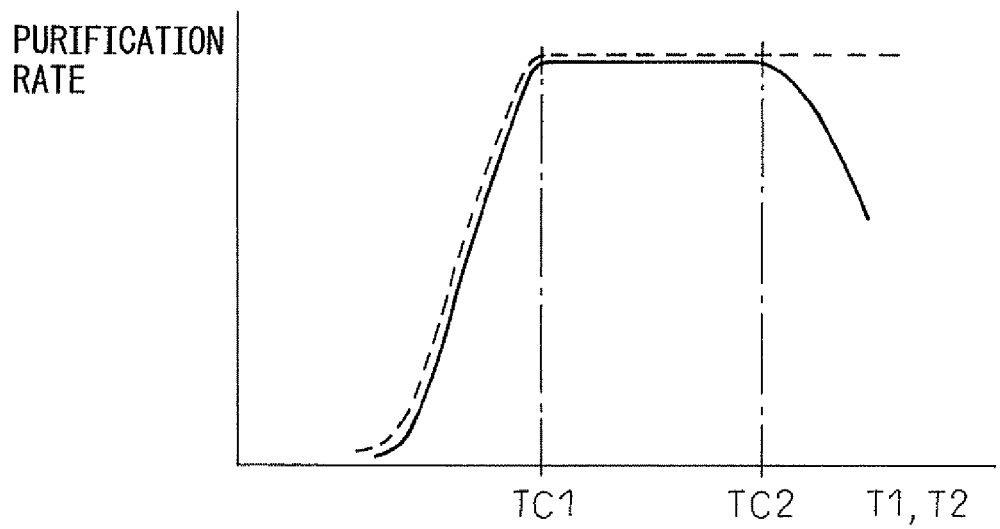
FIG. 11 is a view showing a purification rate by a catalyst.

FIG. 11 to FIG. 14 show an embodiment in a case where the basic ammonia ratio RA is corrected based on the temperature of the exhaust gas or the temperature of the catalyst. The broken line in FIG. 11 indicates the relationship between the purification rate of ammonia by the three-way catalyst or oxidation catalyst 19 and the temperature T1 of the catalyst 19, while the solid line in FIG. 11 indicates the relationship between the $NO_x$ purification rate by the $NO_x$ storage catalyst 21 and the temperature T2 of the catalyst 21. As shown in FIG. 11, both of the catalysts 19 and 21 are lowered in purification rates as the catalyst temperatures T1 and T2 become lower when the temperature TC1 or less and become the maximum purification rate when the temperature TC1 or more. On the other hand, the catalyst 19 is kept at the maximum purification rate even when its temperature exceeds the temperature TC2. However, the catalyst 21 is lowered in purification rate when the temperature TC2 is exceeded. Accordingly, it is seen that the temperature TC1 and temperature TC2 indicate the lower limit temperature and upper limit temperature of the catalyst temperature with which the $NO_x$ purification rate by the $NO_x$ storage catalyst 21 becomes the maximum purification rate.

Figure 12:
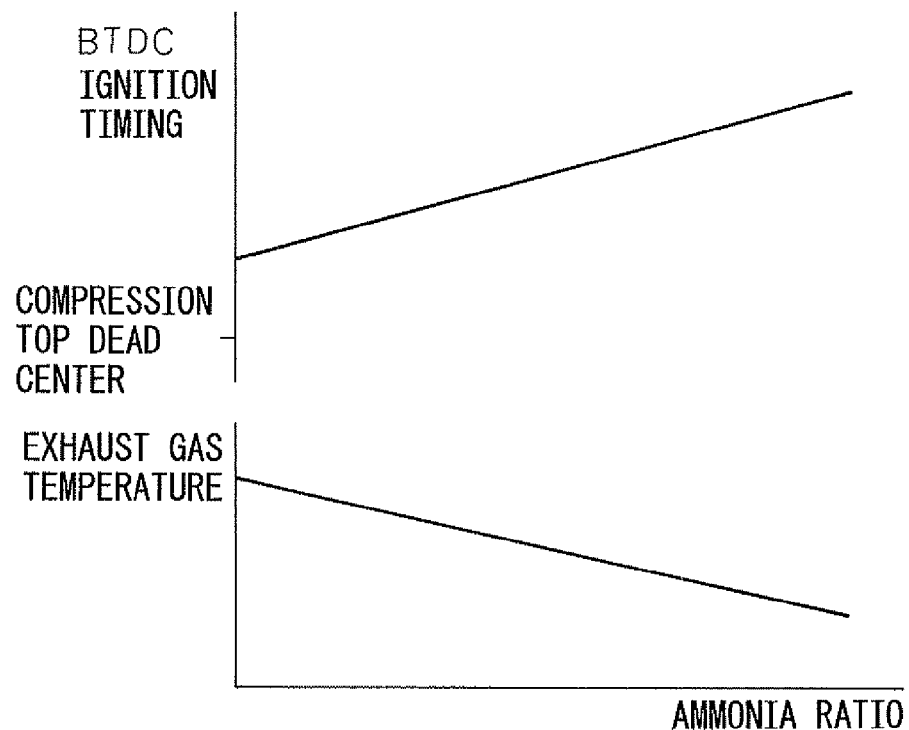
FIG. 12 is a view showing changes of an ignition timing and an exhaust gas temperature.

On the other hand, FIG. 12 shows relationships among the ammonia ratio, ignition timing, and exhaust gas temperature. When the ammonia ratio increases, the combustion speed becomes slower, therefore the ignition timing is advanced to before compression top dead center (BTDC) side. When the ignition timing is advanced, the later burning fuel decreases, therefore the exhaust gas temperature becomes lower. Namely, the exhaust gas temperature changes according to the ammonia ratio. The higher the ammonia ratio, the lower the exhaust gas temperature. In this embodiment, by utilizing such a change of exhaust gas temperature, the temperature T2 of the $NO_x$ storage catalyst 21 is kept within a temperature range in which the maximum purification rate is obtained (TC1<T2<TC2).

Figure 13:
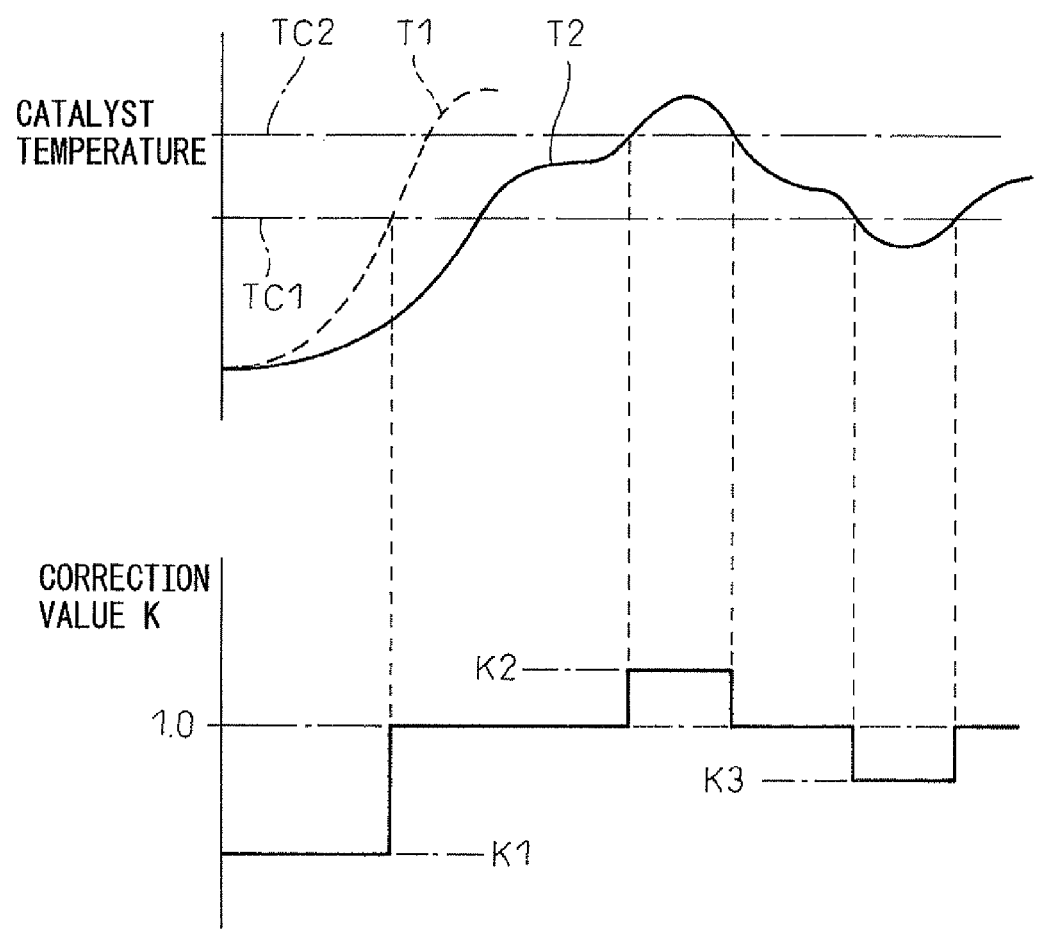
FIG. 13 is a view showing changes of a catalyst temperature and the correction value K.

FIG. 13 shows changes of the temperature T1 of the catalyst 19 and temperature T2 of the catalyst 21 and the change of the correction value K after engine startup. When the temperature T1 of the three-way catalyst or oxidation catalyst 19 is lower than the temperature TC1, that is, when the catalyst 19 is not activated, the purification rate of the unburned ammonia contained in the exhaust gas is low. Accordingly, at this time, in order to decrease the amount of exhaust of the unburned ammonia from the interior of the combustion chamber 5, the correction value K is lowered to a K1 of less than 1.0, whereby the ammonia ratio is made smaller. When the temperature T1 of the catalyst 19 reaches the temperature TC1, the correction value K is made 1.0.

On the other hand, as shown in FIG. 12, the exhaust gas temperature falls when the ammonia ratio is increased, while the exhaust gas temperature rises when the ammonia ratio is lowered. Accordingly, as shown in FIG. 13, the correction coefficient K is increased up to a K2 of more than 1.0 when the temperature T2 of the $NO_x$ storage catalyst 21 exceeds the upper limit temperature TC2, while the correction coefficient K is lowered to a K3 of less than 1.0 when the temperature T2 of the catalyst 21 becomes the lower limit temperature TC1 or less.

Namely, in this embodiment, when it is determined that the temperature of the catalyst 21 should be lowered, the ammonia ratio is increased, while when it is determined that the temperature of the catalyst 21 should be raised, the ammonia ratio is lowered. Note that, the temperature T1 of the catalyst 19 is detected by the temperature sensor 43, while the temperature T2 of the catalyst 21 is detected by the temperature sensor 44.

Figure 14:
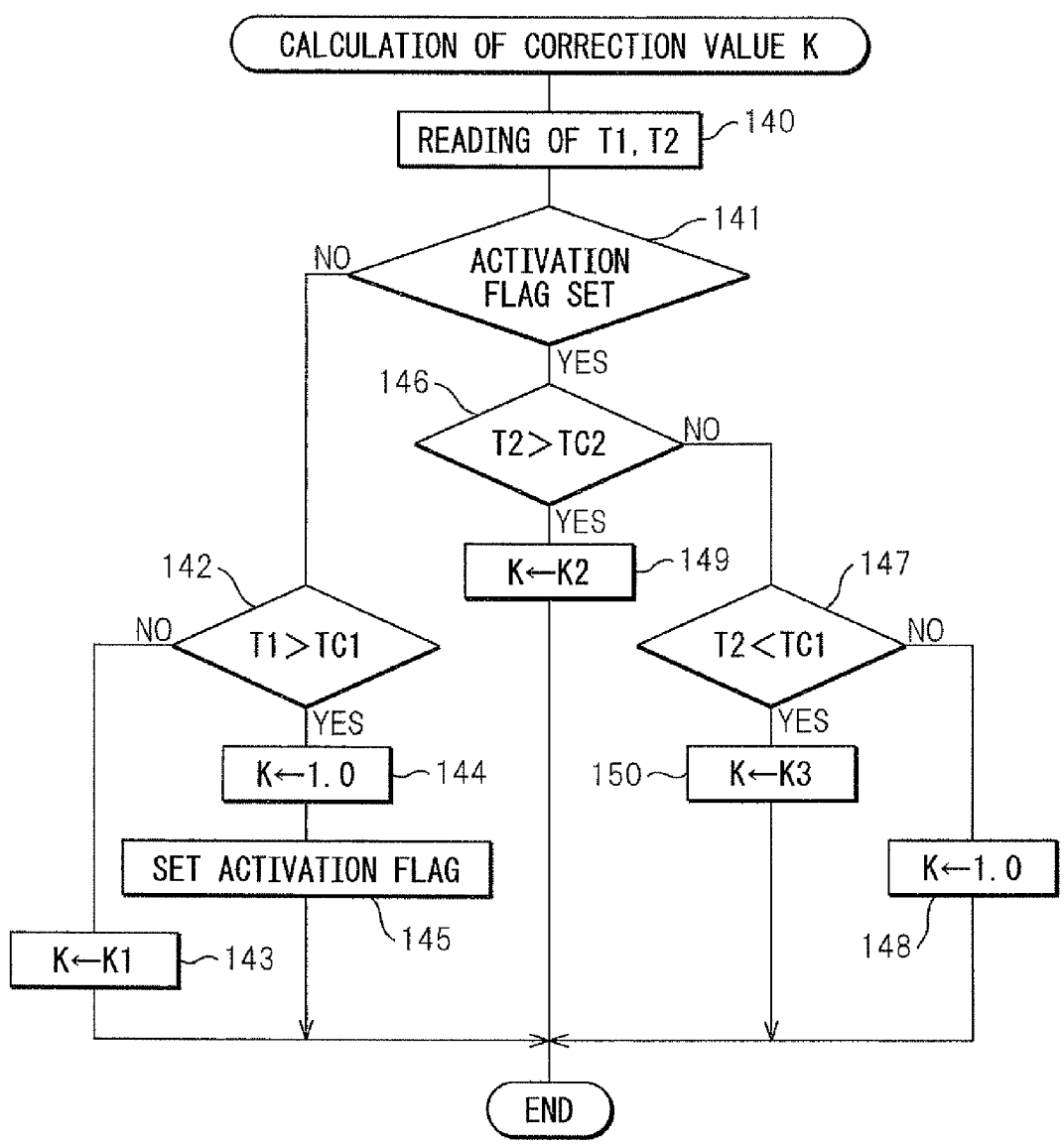
FIG. 14 is a flow chart for calculating the correction value K.

FIG. 14 shows a routine for calculating the correction value K shown in FIG. 13. Note that, when the correction value K is calculated in this routine, the injection control is carried out according to the routine shown in FIG. 5. Referring to FIG. 14, first of all, at step 140, the temperature T1 of the catalyst 19 and the temperature T2 of the catalyst 21 detected by the temperature sensors 43 and 44 are read. Next, at step 141, it is determined whether the activation flag showing that the catalyst 19 is activated is set. When the activation flag is not set, that is, when the catalyst 19 is not activated, the routine proceeds to step 142.

At step 142, it is determined whether the temperature T1 of the catalyst 19 has become higher than the temperature TC1. When T1≦TC1, the routine proceeds to step 143 where the correction value K is made K1. On the other hand, when it is determined at step 142 that T1 becomes larger than TC1, the routine proceeds to step 144 where the correction value K is made 1.0, then the activation flag is set at step 145. When the activation flag is set, the routine proceeds from step 141 to step 146.

At step 146, it is determined whether the temperature T2 of the catalyst 21 exceeds the upper limit temperature TC2. When T2≦TC2, the routine proceeds to step 147 where it is determined whether the temperature T2 of the catalyst 21 is lower than the lower limit temperature TC1. When T2≧TC1, the routine proceeds to step 148 where the correction value K is made 1.0. Contrary to this, when it is determined at step 146 that T2>TC2, the routine proceeds to step 149 where the correction value K is made K2. On the other hand, when it is determined at step 147 that T2<TC1, the routine proceeds to step 150 where the correction value K is made K3.

Figure 15:
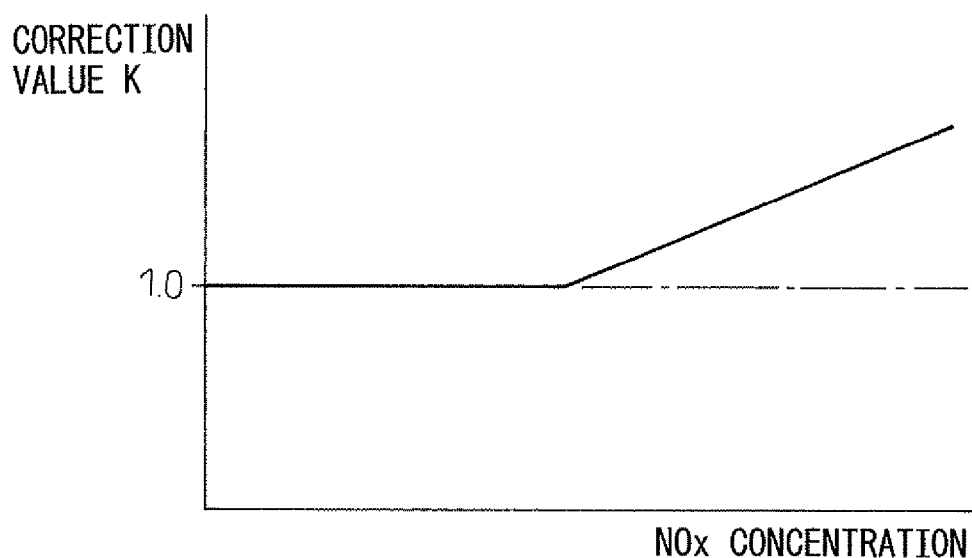
FIG. 15 is a view showing the correction value K.
Figure 16:
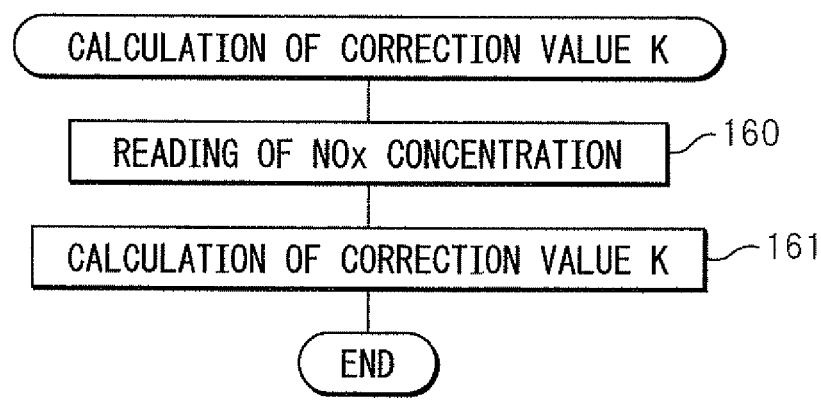
FIG. 16 is a flow chart for calculating the correction value K.

FIG. 15 and FIG. 16 show an embodiment where the basic ammonia ratio RA is corrected based on the $NO_x$ concentration in the exhaust gas. When the combustion temperature in the combustion chamber 5 becomes high, the amount of production of $NO_x$ increases. On the other hand, when the ammonia is increased, the combustion temperature becomes low. Accordingly, in this embodiment, in order to suppress the amount of $NO_x$ exhausted from the combustion chamber 5, when the $NO_x$ concentration in the exhaust gas becomes high, the correction value K is increased as shown in FIG. 15 and the ammonia ratio is increased.

FIG. 16 shows a routine for calculating the correction value K shown in FIG. 15. Note that, when the correction value K is calculated in this routine, the injection control is carried out according to the routine shown in FIG. 5. Referring to FIG. 16, first of all, at step 160, the $NO_x$ concentration detected by the $NO_x$ sensor 48 arranged in the exhaust pipe 20 is read. Next, at step 161, based on this $NO_x$ concentration, the correction value K is calculated from FIG. 15.

Next, the correction of the basic ammonia ratio RA when the closing timing of the intake valve 7 is controlled will be explained with reference to FIG. 17A to FIG. 19. The internal combustion engine shown in FIG. 1 is provided with a variable valve operating mechanism 49 which can control the closing timing of the intake value 7. By this variable valve operating mechanism 49, the closing timing of the intake valve 7 is controlled to any position between the position indicated by the solid line and the position indicated by the broken line in FIG. 17A. When the closing timing of the intake valve 7 is changed, the amount of the intake air fed into the combustion chamber 5 changes. Accordingly, by controlling the closing timing of the intake valve 7, control of the load not according to the throttle valve 16 becomes possible.

Figure 17A:
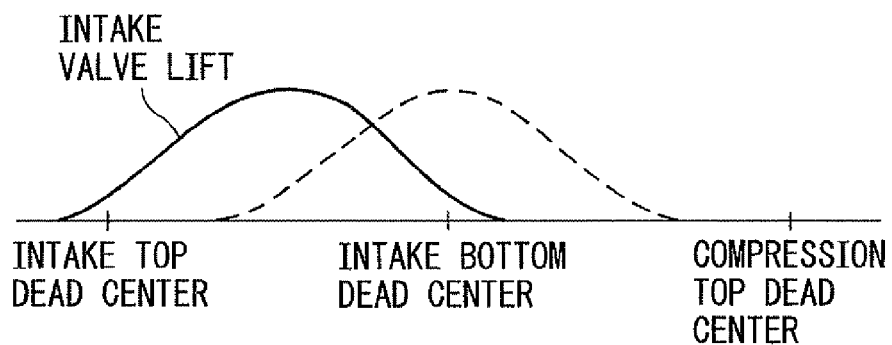
FIGS. 17A and 17B are views showing a change of a closing timing of an intake valve and a change of an actual compression ratio.
Figure 17B:
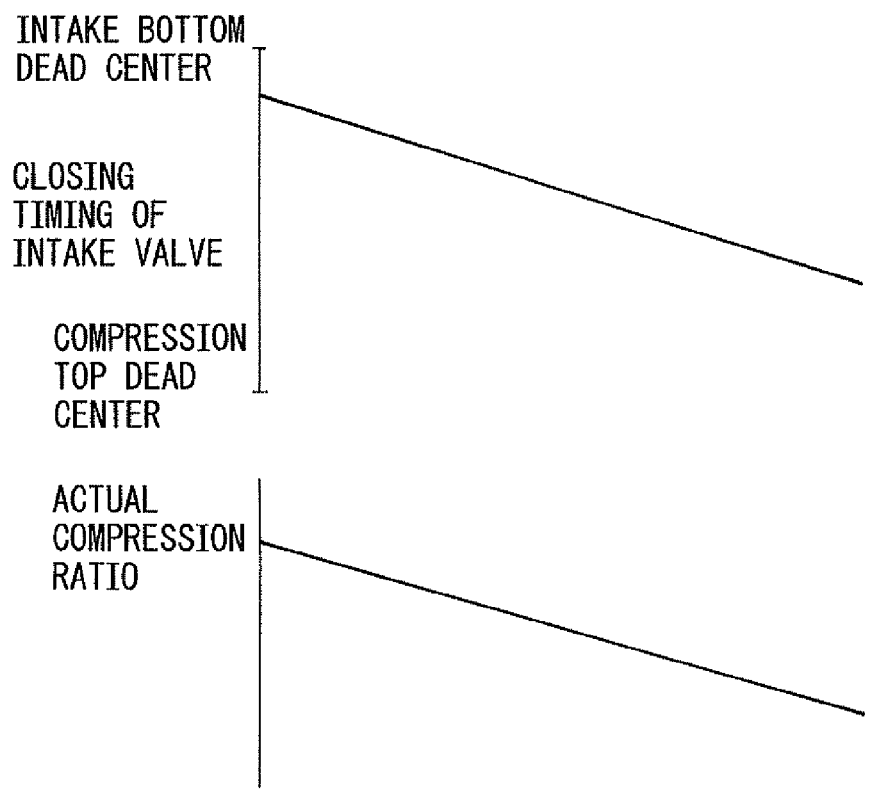

However, in this case, when the closing timing of the intake valve 7 is made to approach the compression top dead center, that is, is retarded, the actual compression ratio becomes low as shown in FIG. 17B. When the actual compression ratio becomes low, combustion becomes hard. At this time, in order to secure stable combustion, it is necessary to lower the ammonia ratio. Accordingly, in the embodiment according to the present invention, as shown in FIG. 18, when the closing timing of the intake valve 7 is retarded and the actual compression ratio becomes low, the correction value K is lowered and the ammonia ratio is lowered.

Figure 18:
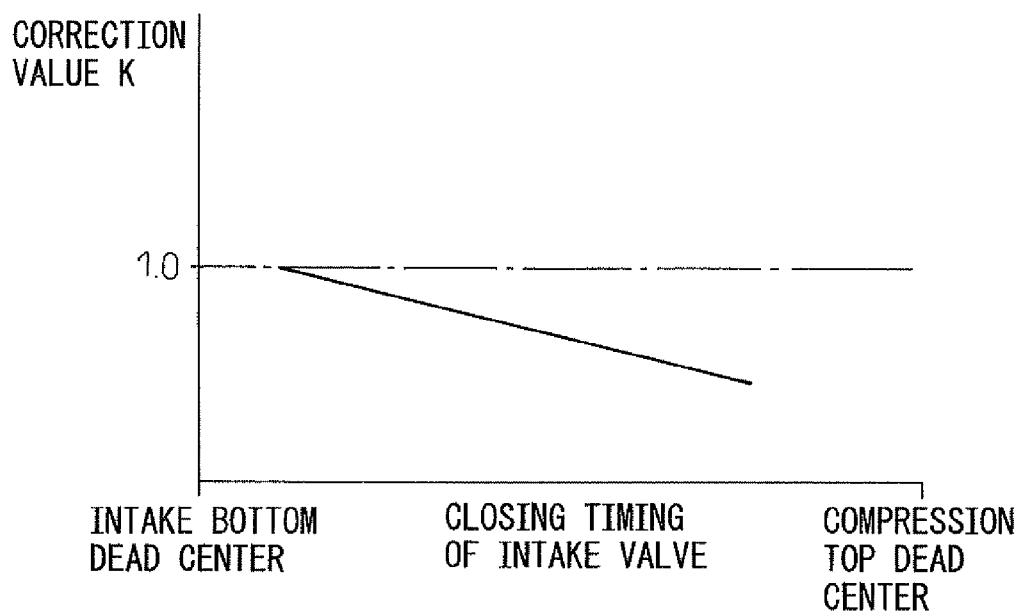
FIG. 18 is a view showing the correction value K.
Figure 19:
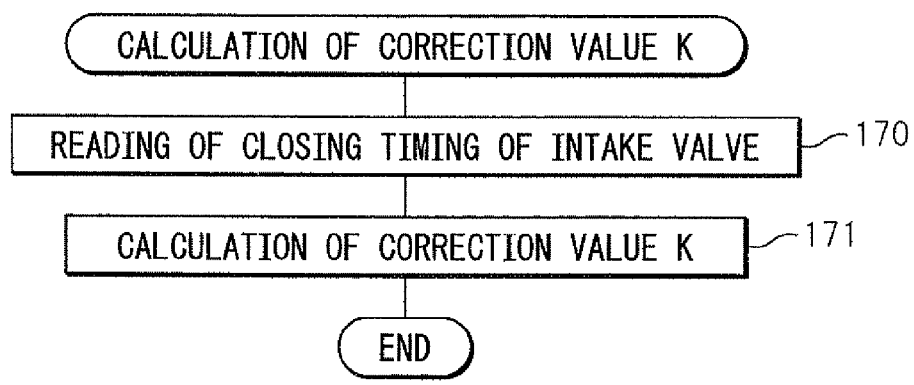
FIG. 19 is a flow chart for calculating the correction value K.

FIG. 19 shows a routine for calculating the correction value K shown in FIG. 18. Note that, when the correction value K is calculated in this routine, the injection control is carried out according to the routine shown in FIG. 5. Referring to FIG. 19, first of all, at step 170, the closing timing of the intake valve 7 is read. Next, at step 171, the correction value K is calculated from FIG. 18 based on this closing timing of the intake valve 7.

Figure 20:
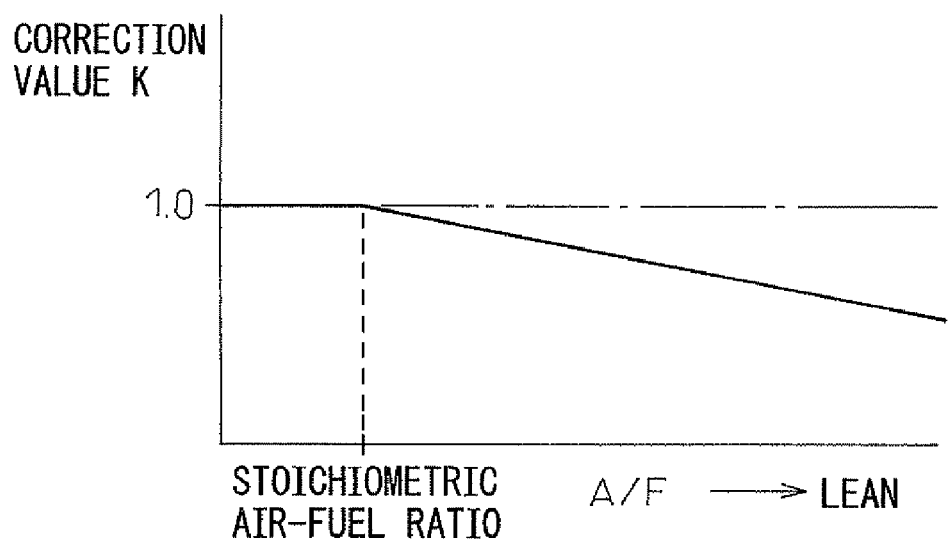
FIG. 20 is a view showing the correction value K.

FIG. 20 to FIG. 24 show a case where the ammonia ratio is changed in accordance with the air-fuel ratio or a case where the ammonia ratio changes by controlling the air-fuel ratio. The air-fuel ratio is controlled to the stoichiometric air-fuel ratio or lean air-fuel ratio in response to various requests. In this case, the leaner the air-fuel ratio, the harder the combustion. Accordingly, in order to obtain stable combustion, it is necessary to lower the ammonia ratio as the air-fuel ratio becomes leaner. Accordingly, in the embodiment according to the present invention, as shown in FIG. 20, as the air-fuel ratio A/F becomes a leaner air-fuel ratio, the correction value K is lowered, and the ammonia ratio is lowered.

Figure 21:
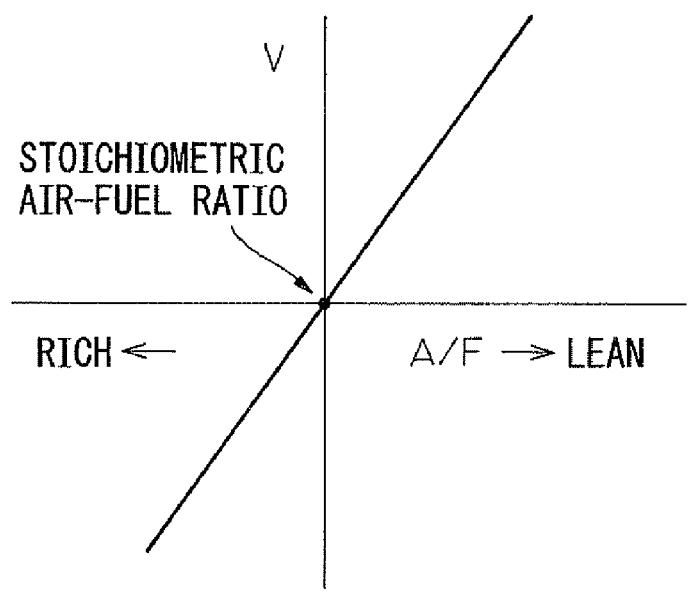
FIG. 21 is a view showing the output of an air-fuel ratio sensor.

FIG. 21 shows the relationship between the output voltage V of the air-fuel ratio sensor 42 and the air-fuel ratio A/F. It is seen from FIG. 21 that the air-fuel ratio A/F can be detected by the air-fuel ratio sensor 42. In the first example, the target air-fuel ratio is set in advance, and the feed amount of the total fuel fed is controlled so that the air-fuel ratio A/F becomes this target air-fuel ratio.

Figure 22:
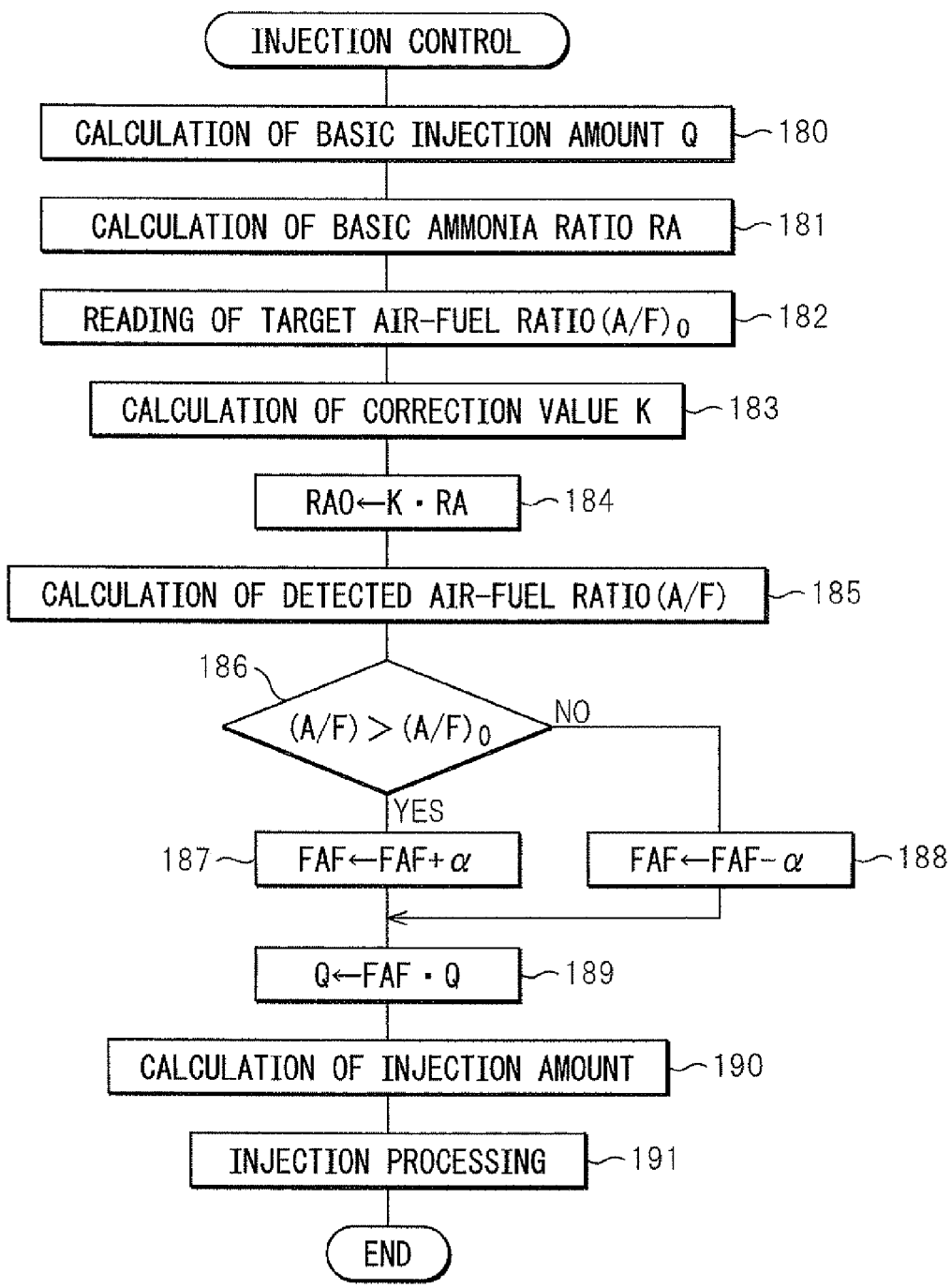
FIG. 22 is a flow chart for injection control.

FIG. 22 shows an injection control routine. Referring to FIG. 22, first of all, at step 180, the basic injection amount Q is calculated from the map shown in FIG. 6A. Next, at step 181, the basic ammonia ratio RA is calculated from the relationship shown in FIG. 2. Next, at step 182, the target air-fuel ratio (A/F)o is read. Next, at step 183, the correction value K is calculated. Next, at step 184, by multiplying the basic ammonia ratio RA with the correction value K, the target ammonia ratio RAO (=K·RA) is calculated.

Next, at step 185, the detected air-fuel ratio (A/F) is calculated from the output voltage V of the air-fuel ratio sensor 42. Next, at step 186, it is determined whether the detected air-fuel ratio (A/F) is larger than the target air-fuel ratio $(A/F)_0$. When $(A/F) > (A/F)_0$, the routine proceeds to step 187 where a constant value α is added to a feedback correction coefficient FAF. Next, the routine proceeds to step 189. Contrary to this, when it is determined at step 186 that $(A/F) \leq (A/F)_0$, the routine proceeds to step 188 where the constant value α is subtracted from the feedback correction coefficient FAF. Next, the routine proceeds to step 189. At step 189, the target basic injection amount Q is calculated by multiplying the basic injection amount Q with the feedback correction coefficient FAF.

Next, at step 190, the amount of ammonia to be injected from the ammonia injector 13 and the amount of the second fuel to be injected from the fuel injector 36 are calculated based on the real injection amount KZ·Q obtained by multiplying the target basic injection amount Q calculated at step 189 with the revision coefficient KZ and the target ammonia ratio RAO calculated at step 184. Next, at step 191, ammonia is injected from the ammonia injector 13 and the second fuel is injected from the fuel injector 36 based on the calculated amounts.

On the other hand, in the second example, the feed amount of the second fuel is controlled so that the detected air-fuel ratio (A/F) becomes the target air-fuel ratio $(A/F)_0$. In the third example, the feed amount of ammonia is controlled so that the detected air-fuel ratio (A/F) becomes the target air-fuel ratio $(A/F)_0$. In both cases, the ammonia ratio is changed along with the control of the feed amount.

Figure 23:
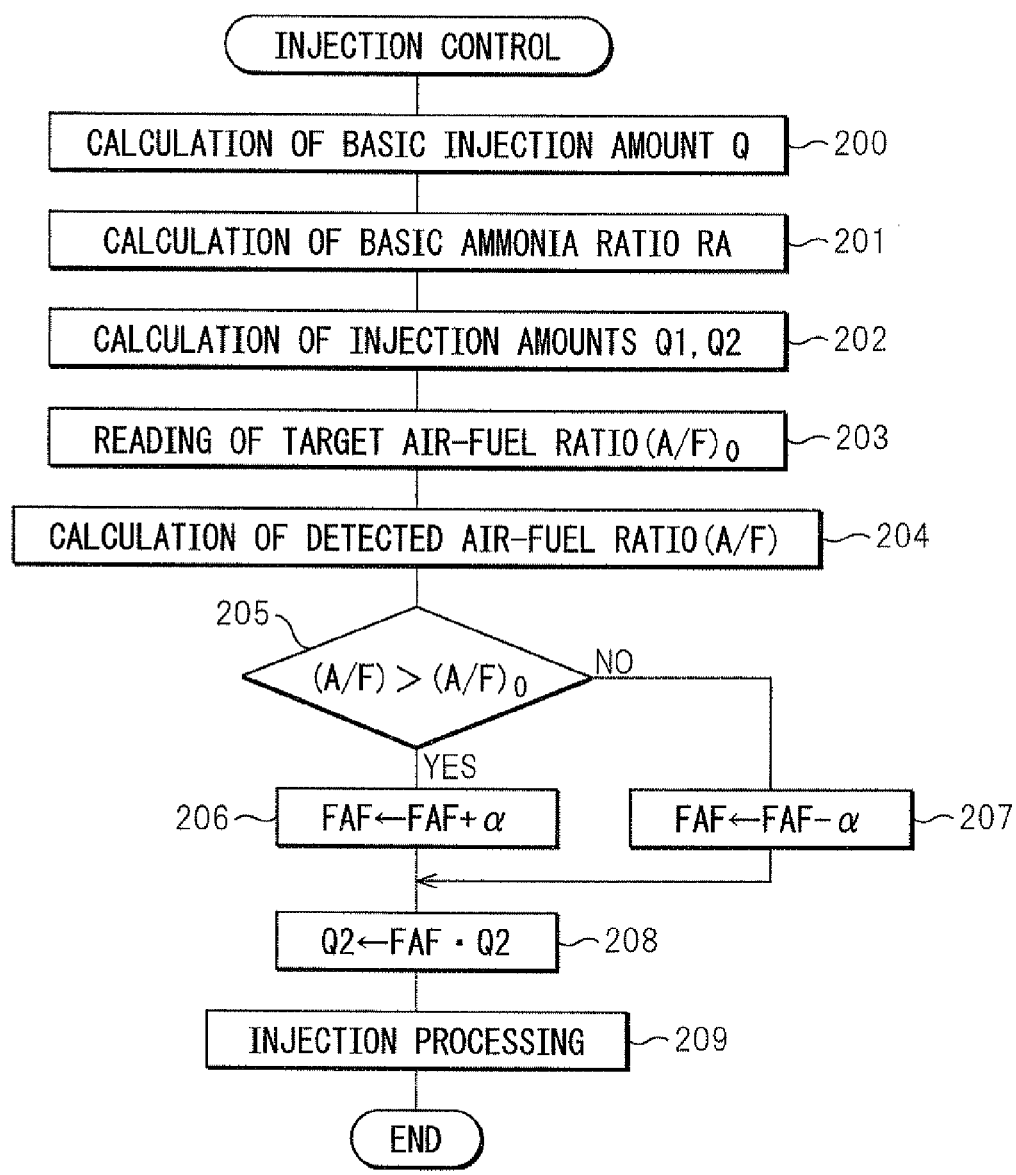
FIG. 23 is a flow chart for injection control.

FIG. 23 shows an injection control routine for executing this second example. Referring to FIG. 23, first of all, the basic injection amount Q is calculated from the map shown in FIG. 6A. Next, at step 201, the basic ammonia ratio RA is calculated from the relationship shown in FIG. 2. Next, at step 202, an amount Q1 of ammonia to be injected from the ammonia injector 13 and an amount Q2 of the second fuel to be injected from the fuel injector 36 are calculated based on the basic injection amount Q calculated at step 200, the revision coefficient KZ, and the basic ammonia ratio RA calculated at step 201.

Next, at step 203, the target air-fuel ratio $(A/F)_0$ is read. Next, at step 204, the detected air-fuel ratio (A/F) is calculated from the output voltage V of the air-fuel ratio sensor 42. Next, at step 205, it is determined whether the detected air-fuel ratio (A/F) is larger than the target air-fuel ratio $(A/F)_0$. When $(A/F) > (A/F)_0$, the routine proceeds to step 206 where the constant value α is added to the feedback correction coefficient FAF. Next, the routine proceeds to step 208. Contrary to this, when it is determined at step 205 that (A/F)≦

(A/F)o, the routine proceeds to step 207 where the constant value α is subtracted from the feedback correction coefficient FAF. Next, the routine proceeds to step 208.

At step 208, the target injection amount Q2 of the second fuel is calculated by multiplying the injection amount Q2 of the second fuel calculated at step 202 with the feedback correction coefficient FAF. Next, at step 209, ammonia is injected from the ammonia injector 13 and the second fuel is injected from the fuel injector 36 based on the ammonia injection amount Q1 calculated at step 202 and the target injection amount Q2 of the second fuel calculated at step 208.

Figure 24:
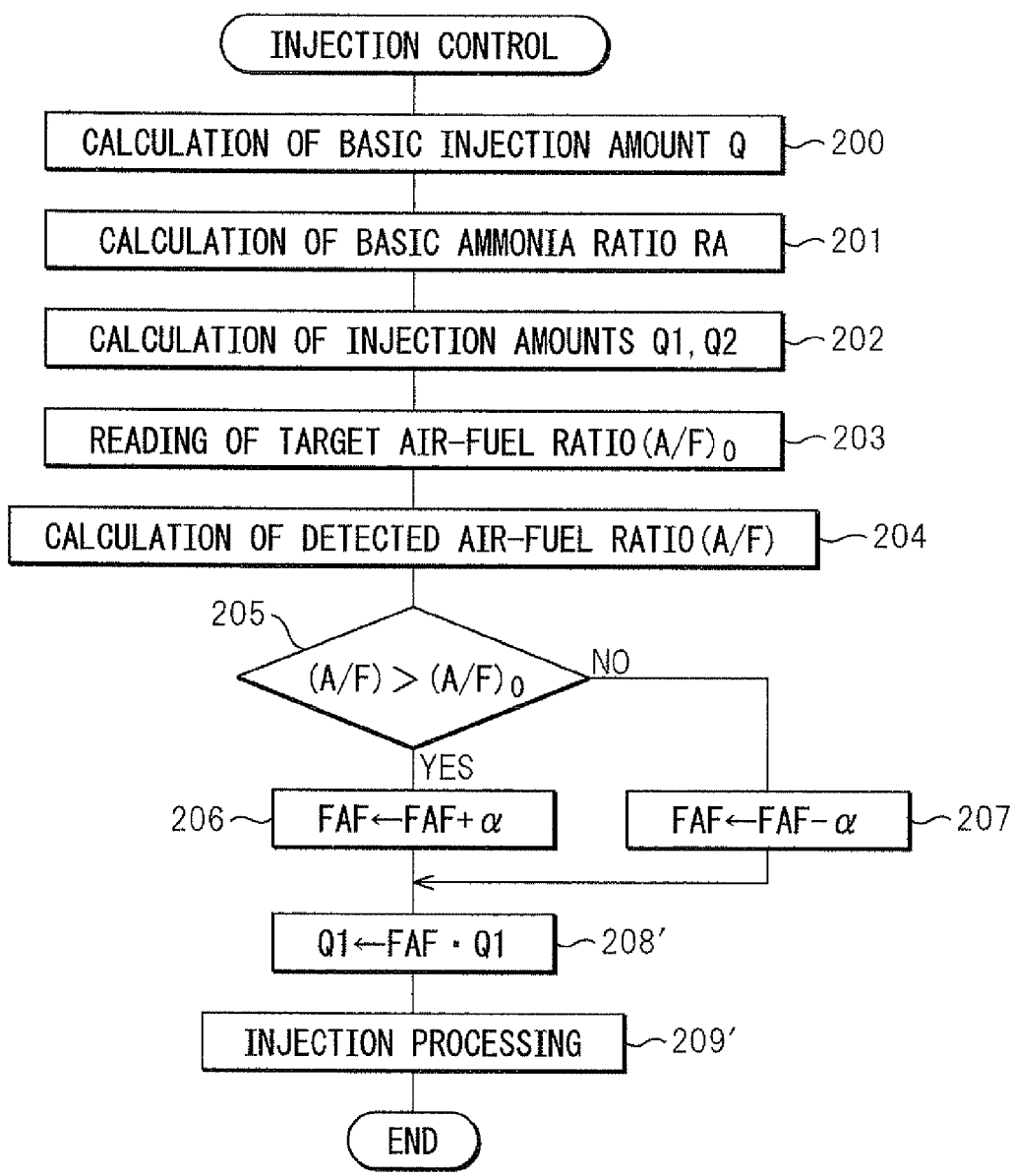
FIG. 24 is a flow chart for injection control.

FIG. 24 shows an injection control routine for executing the third example. In FIG. 24, the difference from FIG. 23 resides in only steps 208' and 209'. Accordingly, an explanation will be given of only these steps. Referring to FIG. 24, at step 208', the target injection amount Q1 of ammonia is calculated by multiplying the injection amount Q1 of ammonia calculated at step 202 with the feedback correction coefficient FAF. Next, at step 209', ammonia is injected from the ammonia injector 13 and the second fuel is injected from the fuel injector 36 based on the target injection amount Q1 of ammonia calculated at step 208' and the injection amount Q2 of the second fuel calculated at step 202.

Figure 25:
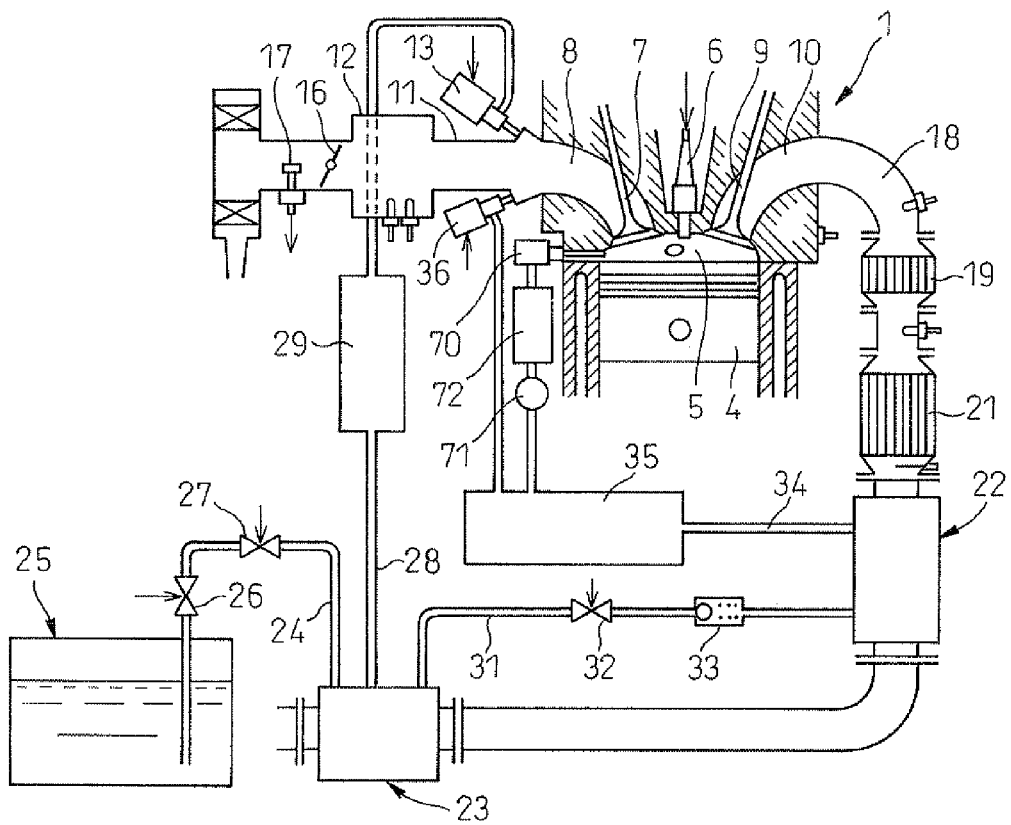
FIG. 25 is an overall view of another embodiment of an internal combustion engine.

FIG. 25 shows another embodiment of the internal combustion engine. In this embodiment, a direct injection use fuel injector 70 for injecting the fuel into the combustion chamber 5 is provided. The reformed gas in the reformed gas storage tank 35 is pressurized by a pressurizing pump 71 and sent into a pressurizing tank 72. High pressure reformed gas in the pressurizing tank 72 is injected into the combustion chamber 5 from the fuel injector 70 immediately before the ignition. The hydrogen in this reformed gas forms an ignition source, thus the air-fuel mixture containing ammonia is easily ignited.

A hydrogen storing alloy able to store hydrogen may be arranged in the reformed gas storage tank 35. Hydrogen stored in the hydrogen storage alloy may be stored in the pressurizing tank 72 as well. In this case, hydrogen is injected from the fuel injector 70 into the combustion chamber 5, and accordingly the ignitability of the air-fuel mixture containing ammonia is further improved.

Figure 26:
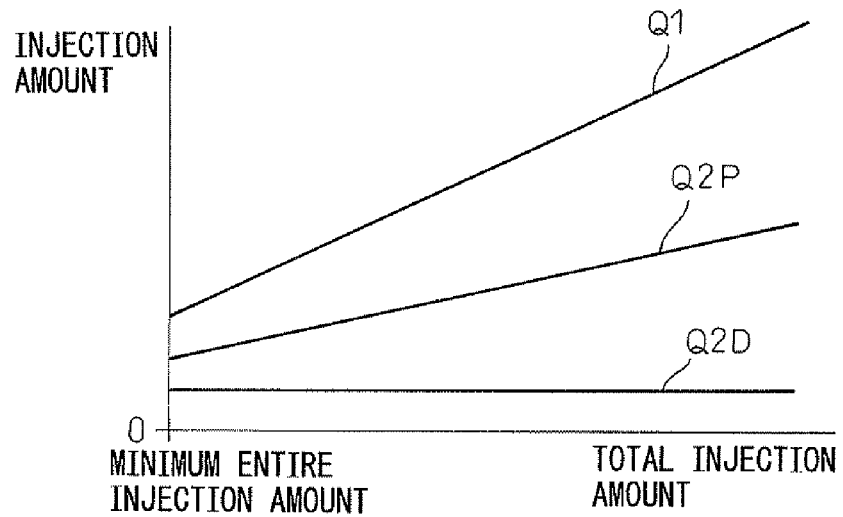
FIG. 26 is a view showing an injection amount.

FIG. 26 shows the injection amount Q1 from the ammonia injector 13, the injection amount Q2P of the second fuel from the fuel injector 36 into the intake passage, and the injection amount IND of the second fuel from the fuel injector 70 into the combustion chamber 5. In this embodiment as well, the ammonia ratio is controlled in accordance with the operating state of the engine. Further, the second fuel injected from the fuel injector 70 is used as the ignition source, therefore the injection amount Q2D of this second fuel is made almost constant irrespective of the magnitude of the total amount of injection. Accordingly, in this embodiment, as shown in FIG. 26, as the total feed amount of the second fuel (Q2P+Q2D) increases, the ratio of the feed amount Q2E of the second fuel into the engine intake passage with respect to the total feed amount of the second fuel (Q2P+Q2D) is increased.

While the invention has been described with reference to specific embodiments chosen for purpose of illustration, it should be apparent that numerous modifications could be made thereto by those skilled in the art without departing from the basic concept and scope of the invention.

The invention claimed is:

1. A control system of an internal combustion engine using a first fuel of ammonia and a second fuel which is easier to burn than ammonia as fuel and feeding these two types of fuel into a combustion chamber to burn the fuel in the combustion chamber, wherein a basic ammonia ratio indicating a ratio of an amount of ammonia fed with respect to a total amount of fuel fed in accordance with an engine load and an engine speed is set, and the set basic ammonia ratio is corrected based on at least one of a combustion state, knocking strength, temperature of an exhaust gas or temperature of a catalyst arranged in an engine exhaust passage, $NO_x$ concentration in the exhaust gas, actual compression ratio, air-fuel ratio, and fuel properties.

2. A control system of an internal combustion engine as claimed in claim 1, wherein an ammonia ratio is increased if a knocking strength is increased.

3. A control system of an internal combustion engine as claimed in claim 1, wherein an ammonia ratio is lowered when it is determined from the temperature of the exhaust gas or the temperature of the catalyst that the catalyst is not activated.

4. A control system of an internal combustion engine as claimed in claim 1, wherein an ammonia ratio is increased when the $NO_x$ concentration in the exhaust gas rises.

5. A control system of an internal combustion engine as claimed in claim 1, wherein a closing timing of an intake valve is controllable, and an ammonia ratio is lowered when the closing timing of the intake valve is retarded and the actual compression ratio falls.

6. A control system of an internal combustion engine as claimed in claim 1, wherein an ammonia ratio is lowered the leaner the air-fuel ratio.

7. A control system of an internal combustion engine as claimed in claim 1, wherein a target air-fuel ratio is preset, a feed amount of said second fuel is controlled so that an air-fuel ratio becomes the target air-fuel ratio, and the ammonia ratio is changed along with this.

8. A control system of an internal combustion engine as claimed in claim 1, wherein a target air-fuel ratio is preset, a feed amount of ammonia is controlled so that an air-fuel ratio becomes the target air-fuel ratio, and the ammonia ratio is changed along with this.

9. A control system of an internal combustion engine as claimed in claim 1, wherein fuel injectors for injecting said second fuel are arranged in an engine intake passage and combustion chamber, and a ratio of the amount of feed of the second fuel to the engine intake passage to the total amount of feed of the second fuel is increased the greater the total amount of feed of the second fuel.

10. A control system of an internal combustion engine as claimed in claim 1, wherein said combustion state is a combustion rate, and an ammonia ratio is increased the faster the combustion rate.

11. A control system of an internal combustion engine as claimed in claim 10, wherein the ammonia ratio is increased the higher a water temperature, intake temperature, or oil temperature or the lower a humidity of an intake air.

12. A control system of an internal combustion engine as claimed in claim 1, wherein said combustion state is a combustion fluctuation, and an ammonia ratio is lowered the greater the combustion fluctuation.

13. A control system of an internal combustion engine as claimed in claim 12, wherein the ammonia ratio is lowered the greater an amount of fluctuation of a combustion pressure or amount of fluctuation of an engine output torque.

14. A control system of an internal combustion engine as claimed in claim 1, wherein an ammonia ratio is increased when it is determined from the temperature of the exhaust gas or the temperature of the catalyst that the temperature of the catalyst should be lowered.

15. A control system of an internal combustion engine as claimed in claim 14, wherein an ammonia ratio is decreased when it is determined from the temperature of the exhaust gas or the temperature of the catalyst that the temperature of the catalyst should be raised.

\* \* \* \* \*